United States Patent [19]

Ellison

[11] Patent Number: 4,880,205

[45] Date of Patent: * Nov. 14, 1989

[54] HUNG DIAPHRAGM SOLENOID VALVE

[75] Inventor: John E. Ellison, Mayfield Heights, Ohio

[73] Assignee: Parker Hannifin Corporation, Cleveland, Ohio

[*] Notice: The portion of the term of this patent subsequent to Nov. 8, 2005 has been disclaimed.

[21] Appl. No.: 252,684

[22] Filed: Feb. 5, 1988

Related U.S. Application Data

[63] Continuation of Ser. No. 68,591, Jun. 30, 1987, Pat. No. 4,783,044.

[51] Int. Cl.$^4$ .............................................. F16K 31/385
[52] U.S. Cl. .................................. 251/30.02; 251/38; 251/129.15
[58] Field of Search ........... 251/38, 30.02, 45, 129.15, 251/30.03, 30.01

[56] References Cited

U.S. PATENT DOCUMENTS

| | | | |
|---|---|---|---|
| 3,208,716 | 9/1965 | Rolfe | 251/38 X |
| 3,738,607 | 6/1973 | Peruglia | 251/45 X |
| 3,994,318 | 11/1976 | Ishagaki | 251/45 X |
| 4,082,116 | 4/1978 | Stampfli | 251/45 X |
| 4,102,526 | 7/1978 | Hargraves | |
| 4,469,134 | 9/1984 | Kanai et al. | |
| 4,558,498 | 12/1985 | Satoh | |
| 4,561,632 | 12/1985 | Hugler | |
| 4,577,661 | 3/1986 | Melrose | |

Primary Examiner—Arnold Rosenthal
Attorney, Agent, or Firm—Renner, Otto, Boisselle & Sklar

[57] ABSTRACT

A solenoid valve of the hung diaphragm type includes a diaphragm assembly having a pilot valve seat mounted for movement toward and away from a main valve seat in a valve body, a plunger assembly consisting of a valve disc holder reciprocably mounted in the pole piece of the electromagnetic valve resiliently supports a valve disc for cooperation with the pilot valve seat, being actuated by a plunger slideably mounted in an enclosure tube. The valve holder is biased to an upper position and a pickup extension spring is coupled between the valve holder and diaphragm valve assembly to lift the latter from the main valve seat. A necked down end of the valve holder prevents abrasion at the edge of the pole piece while a groove in the actuating face of the plunger prevents excessive distortion of the end of the pole piece due to repetitive impacts.

10 Claims, 1 Drawing Sheet

HUNG DIAPHRAGM SOLENOID VALVE

This is a continuation of copending application Ser. No. 068,591, filed June 30, 1987, now U.S. Pat. No. 4,783,044 dated Nov. 8, 1988.

BACKGROUND OF THE INVENTION

This invention relates to solenoid valves for liquid and gaseous fluids wherein the valve member can be actuated by means of a plunger which is moveable relative to the valve seat and is located in the magnetic field of an electromagnet.

In known forms of solenoid valves of this type a diaphragm is disposed relative to a main valve seat for controlling the flow of fluid through the valve, being aided in its closing and opening actions by the fluid under pressure being controlled by the valve. In such an arrangement a pilot valve is often typically used to open or close an orifice through the diaphragm itself to achieve the necessary differential fluid pressures for control of the position of the diaphragm and which pilot valve opening is selectively opened and closed by the moving plunger of the electromagnetic coil assembly. In arrangements of this type the pilot valve is controlled by an elastomeric valve disc supported in a disc holder which receives its actuation from the moveable plunger. Spring means are provided for return movement of the disc holder and its assembly to a normally inactivated position while a second spring acting between the valve body and the diaphragm assembly serves to urge the latter also to a normally open position. The springs are selected in order to obtain a proper operating characteristic for the valve assembly and it is apparent with a great number of components involved that assembly procedures for the valve structure are difficult and complicated and subject to misassembly at high production levels.

An object of the present invention is to provide an improved solenoid valve assembly which is more readily assemblable than prior art designs and which is less subject to misassembled components.

Another object of the present invention is to provide a solenoid valve which exhibits a more reliable action valving at different pressure levels than prior art designs and which includes improved constructional characteristics.

SUMMARY OF THE INVENTION

These and other objects of the invention are achieved by providing a solenoid valve for fluids wherein the valve member is actuated by a plunger which is moveable with respect to the valve seat and in which a pilot valve assembly and disc holder assembly for actuating the pilot valve are joined by a pickup extension spring for biased concurrent movement at various operating positions.

In this arrangement, a valve body supports an elastomeric diaphragm assembly in operating relation to a main valve seat, which valve assembly includes a pilot valve therein and a cup device for limiting upward travel of the valve assembly. Pilot valve actuation is achieved by a moveable plunger supported in an electromagnetic coil assembly which plunger movement is transmitted by way of a disc holder to a resiliently mounted sealing disc operatively associated with the pilot valve seat. A disc holder return spring urges the disc holder and the plunger to an upward position in the absence of magnetic force while a pickup extension spring connecting between the disc holder and the pilot valve assembly serves to urge the latter upwardly, away from the main valve seat to an open position. In this position the valve member is spaced from the pilot valve seat, maintaining drainage of fluid from above the diaphragm through the pilot valve orifice and consequently an upward biasing pressure imbalance across the diaphragm to keep it in the open position.

A further object of the invention is to provide an improved disc holder and plunger configuration to avoid fracture and binding of the latter due to repetitive interengagement therebetween during operating cycles.

DETAILED DESCRIPTION OF THE INVENTION

Figure 1:
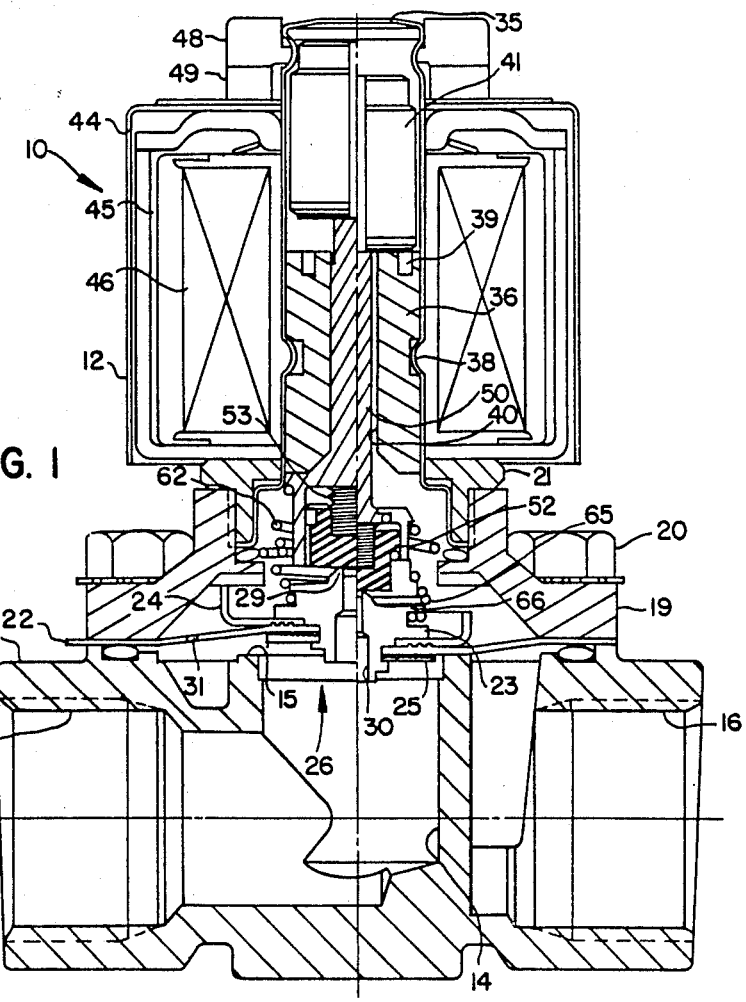
FIG. 1 is an elevational view in cross-section of a preferred embodiment of the solenoid valve of the invention shown in de-energized and energized conditions on either side of a vertical center line.

The operating description of the invention in the form of the preferred embodiment shown in the drawings may best be understood by referring to FIG. 1 for the general assembly and for the operation of the related parts. Solenoid valve 10 comprises body member 11 and electromagnetic coil assembly 12 joined together to provide actuation of valving components therein. Body member 11 typically comprises a metal casting having a generally vertical bore 14 terminating in main valve seat 15 and having inlet port 16 at one side of body member 11 and outlet port 18 at the other side, both communicating with valve seat 15 in a manner well understood in the art. Body member 11 further comprises a cover casting 19 secured to the body by fasteners 20, while a bonnet 21 is threadedly received in an opening at the top of cover 19.

A circular elastomeric diaphragm valve 22 is secured between cover 19 and body member 11 and serves as the main valving member for opening and closing main valve seat 15. Diaphragm valve 22 further supports at its central section pilot valve 23 and cup member 24 for movement as a unit relative to valve seat 15. Pilot valve 23, cup member 24, and elastomeric diaphragm valve 22 are further supported by a lower washer 25 which is staked in place to pilot valve 23 and the entire unit moves as a common assembly referred to as diaphragm valve assembly 26.

Pilot valve 23 is a generally circular member machined to form a valve seat 29 at the uppermost portion thereof and having central bore 30 forming an orifice therethrough for flow of fluid from one side of diaphragm 22 to the other. Diaphragm valve 22 further includes a small diaphragm orifice 31 therein which is a smaller opening than that of bore 30 in pilot valve 23.

An enclosure tube 35, being a conventional, formed, thin metal tube, is supported in body member 11, being secured by bonnet 21 and contains therein cylindrical pole piece 36 which is fixed in place by a rolled-in groove 38. Pole piece 36 further includes a conventional shading ring 39 at the upper portion thereof and a central bore 40 extending vertically upwardly in line with the central axis of valve 11. A cylindrical plunger 41 is slideably supported within enclosure tube 35 for providing actuation for solenoid valve 10 in response to an electric current. Electromagnetic coil assembly 12, comprising conventional housing 44, flux frame 45 and coil windings 46 are slideably received on enclosure tube 35 and secured in place by a snap ring connector 48 which is positioned over a spacer ring 49 and received in a groove at the upper end of enclosure tube 35.

Figure 2:
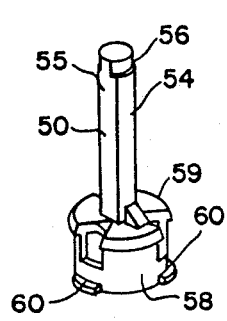
FIG. 2 is a perspective view of the valve holder portion of the solenoid valve of FIG. 1.
Figure 3:
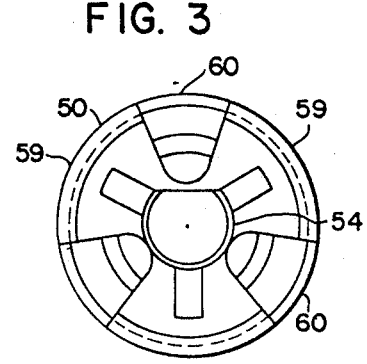
FIG. 3 is an upper end view of the valve holder of FIG. 2.

Slideably received in pole piece 36 is disc holder 50 which supports at its lower portion valve disc 52 and valve disc spring 53 for movement as a unitary assembly. As seen more clearly in FIGS. 2 and 3, disc holder 50 comprises an elongated generally circular stem 54 having a flat 55 on one side thereof ending at its upper end in a reduced end portion 56. At its lower portion, stem 54 supports a generally circular, inverted cup housing 58 having three evenly spaced external shoulders 59 at the upper portion thereof and three evenly spaced external shoulders 60 at the lower portion thereof, which shoulders serve as spring retainers. Valve disc 52 is a generally circular elastomeric disc and includes laterally projecting shoulders thereon as well. Disc 52 is slideably received and supported in the lower portion of cylindrical housing 58 and secured therein by interengagement with inwardly disposed shoulders on housing 58. Thus, valve disc 52 is urged downwardly by disc spring 53 and provides a resilient closure for pilot valve 23. Disc holder 50 is urged upwardly by disc holder return spring 62 which is a conical spring disposed between the upper shoulders 59 of disc holder 50 and an upwardly projecting ledge on cover 19 of body member 11. As shown on the left-hand side of FIG. 1, disc holder 50 is urged upwardly into engagement with pole piece 36 when the solenoid valve is de-energized.

A pickup extension spring 65 is disposed between diaphragm valve assembly 26 and disc holder 50, being engaged between the lower shoulders 60 of disc holder 50 and a shoulder 66 formed on the outer periphery of pilot valve 23. Pickup spring 65 is an extension-type spring, generally being a coil spring having its coils in a normally collapsed condition closely adjacent one another and extendable under force to a spaced coil condition. Under urging of pickup spring 65 diaphragm valve assembly 26 is urged upwardly together with disc holder 50 to move diaphragm valve 22 to an open position. As seen at the left-hand side of FIG. 1, diaphragm valve 22 is moved upwardly to a position spaced from main valve seat 15 until cup 24 engages an internal shoulder in cover 19 to positively limit further upward movement. As noted, disc holder return spring 62 urges disc holder 50 to an uppermost position causing such extension of pickup spring 65.

Thus, it will be apparent that the diaphragm valve assembly 26 is supported from the plunger assembly, and in particular valve holder 50 thereof, for concurrent movement until a positive stop is reached or the spring forces are unbalanced. Thus, for example, upon initial energization of solenoid valve 10 plunger 41 will be moved downwardly together with valve holder 50 against the bias of disc holder return spring 62 urging valve disc 52 toward pilot valve seat 29, but also moving pilot valve 23 by means of pickup spring 65 to a lower position whereby elastomeric diaphragm valve 22 moves toward engagement with main valve seat 15. Depending upon pressure levels involved if pilot valve 23 is closed initially before closure of main valve, fluid under pressure from inlet port 16 will be directed over diaphragm valve 22 by way of orifice 31 to supply additional closing force to urge valve 22 into secure engagement with valve seat 15. With such reduced force requirement upon diaphragm valve assembly 26, a reduced wattage requirement is realized from electromagnetic coil assembly 12 and the closed position of main valve 15 can be maintained with relatively little electrical power.

Upon de-energization of coil 46 valve holder 50 will be urged upwardly by disc holder return spring 62 and if a minimal pressure is acting upon diaphragm valve 22, the entire valve assembly 26 will be elevated together with disc holder 50 by means of pickup spring 65. If the pressure above diaphragm valve 22 is relatively high preventing upward movement thereof together with disc holder 50, pickup spring 65 will be stretched to a larger dimension and valve disc 52 will be lifted from pilot valve seat 29 opening orifice 30 therein. Since the diameter of orifice 30 is significantly larger than that of diaphragm orifice 31, pressure from above diaphragm valve 22 will be relieved so that the entire diaphragm valve assembly 26 can be elevated by means of the resultant upwardly urging pressure imbalance and pickup spring 65 to the position where cup member 24 engages cover 19 to limit further movement.

As noted, disc holder 50 is necked at its upper portion 56 to an extent such that the reduced portion never fully protrudes from bore 40 of disc holder 50. By this device disc holder 50 never engages the uppermost inner edge of pole piece 36 forming bore 40 and avoids abrasion at this location. This prevents a possible subsequent galling or scraping of disc holder 50 which might produce particles which lodge between the upper face of pole piece 36 and the lower face of plunger 41 and a wattage-producing and noise-producing gap in the magnetic field.

Figure 4:
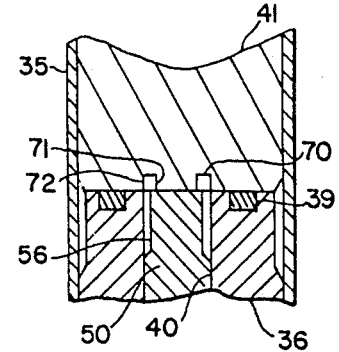
FIG. 4 is a partial sectional view of the solenoid valve of FIG. 1, showing the engagement among the plunger, pole piece and valve holder components.

A still further modification of the instant invention is the provision of groove 70 in the lower face of plunger 41 as best seen in the enlarged partial sectional view of FIG. 4. Groove 70 is an annular groove having concentric inner and outer walls 71, 72 respectively, and of a relatively small axial depth. Outer wall 70 is positioned substantially in alignment with the bore 40 of pole piece 36 while inner wall 71 is positioned inwardly of the necked portion 56 of disc holder 50. By this arrangement, impingement between plunger 41 and pole piece 36 which produces a peening action on the uppermost end of pole piece 36 and a possible eventual interference with the disc holder 50, is substantially eliminated since no impact occurs between the two elements at the groove 70 location. It has been determined that such configuration provides advantageous results in the operating characteristics of such solenoid valve 10 over a large number of operating cycles.

I claim:
1. A solenoid valve, comprising
   a valve body having a main valve seat,
   a diaphragm valve supported in said body for movement toward and away from said main valve seat, said diaphragm valve assembly comprising a diaphragm valve, means for limiting valve movement and a pilot valve seat,
   a plunger assembly supported for movement toward and away from said pilot valve seat, said plunger assembly comprising a valve disc engageable with said pilot valve seat for controlling fluid flow therethrough, main spring means engaged between said plunger assembly and said valve body for biasing said plunger assembly away from valve seat and a plunger for moving said plunger assembly, an electromagnet mounted on said body for actuating said plunger in response to electrical current, and a pickup spring joining said plunger assembly and said diaphragm valve assembly for providing bias force upon said diaphragm valve assembly.

2. A solenoid valve, comprising a valve body having a main valve seat, a diaphragm valve assembly supported in said body for movement toward and away from said main valve seat, said diaphragm valve assembly comprising a diaphragm valve, means for limiting valve movement and a pilot valve seat, a plunger assembly supported for movement toward and away from said pilot valve seat, said plunger assembly comprising a valve disc engageable with said pilot valve seat for controlling fluid flow therethrough, main spring means for biasing said plunger assembly and a plunger for moving said plunger assembly, an electromagnet mounted on said body for actuating said plunger in response to electrical current, and a pickup spring joining said plunger assembly and said diaphragm valve assembly for providing bias force upon said diaphragm valve assembly, said plunger assembly further comprising a disc holder having a stem vertically slideable in a pole piece and a disc spring resiliently supporting said valve disc therein, and said disc holder being engaged by said pickup spring.

3. The solenoid valve set forth in claim 2 wherein said pickup spring is an extension spring having normally collapsed coils and being extendable under force to an expanded position.

4. The solenoid valve set forth in claim 3 wherein said disc holder comprises an inverted cup supported from said stem having upper and lower shoulders thereon for engagement respectively by said main spring means and said pickup spring.

5. The solenoid valve set forth in claim 4 wherein said pilot valve seat includes a shoulder thereon for receipt of one end of said pickup spring and wherein said limiting means comprises a cup member fixed to said pilot valve seat and engageable with said valve body at the upper limit of movement of said diaphragm valve assembly.

6. The solenoid valve set forth in claim 5 wherein said stem of said disc holder includes a flat thereon to provide a path for fluid flow through said pole piece.

7. A solenoid valve, comprising a valve body having a main valve seat, a diaphragm valve assembly supported in said body for movement toward and away from said main valve seat, said diaphragm valve assembly comprising a diaphragm valve, means for limiting valve movement and a pilot valve seat, a plunger assembly supported for movement toward and away from said pilot valve seat, said plunger assembly comprising a valve disc engageable with said pilot valve seat for controlling fluid flow therethrough, main spring means for biasing said plunger assembly and a plunger for moving said plunger assembly, an electromagnet mounted on said body for actuating said plunger in response to electrical current, and a pickup spring joining said plunger assembly and said diaphragm valve assembly for providing bias force upon said diaphragm valve assembly.

said plunger assembly further comprising a disc holder movable relative to said plunger and a disc resiliently biasing said valve disc toward said pilot valve seat.

8. The solenoid valve set forth in claim 7 wherein said main spring means biases said plunger assembly away from said valve seat.

9. The solenoid valve set forth in claim 8 wherein said pickup spring is an extension spring having normally collapsed coils and being extendable under force to an expanded position.

10. The solenoid valve set forth in claim 9 wherein said disc holder comprises an inverted cup having upper and lower shoulders thereon for engagement respectively by said main spring means and said pickup spring.

* * * * *